United States Patent
Kidney

(10) Patent No.: US 9,620,165 B2
(45) Date of Patent: Apr. 11, 2017

(54) BANDED ALLOCATION OF DEVICE ADDRESS RANGES IN DISTRIBUTED PARITY SCHEMES

(71) Applicant: NetApp, Inc., Sunnyvale, CA (US)

(72) Inventor: Kevin Kidney, Lafayette, CO (US)

(73) Assignee: NetApp, Inc., Sunnyvale, CA (US)

( * ) Notice: Subject to any disclaimer, the term of this patent is extended or adjusted under 35 U.S.C. 154(b) by 100 days.

(21) Appl. No.: 14/632,472

(22) Filed: Feb. 26, 2015

(65) Prior Publication Data
US 2016/0253250 A1    Sep. 1, 2016

(51) Int. Cl.
G06F 11/00    (2006.01)
G11B 20/18    (2006.01)
G06F 11/10    (2006.01)

(52) U.S. Cl.
CPC ...... *G11B 20/1889* (2013.01); *G06F 11/1008* (2013.01); *G06F 11/1076* (2013.01)

(58) Field of Classification Search
CPC .................................................. G06F 11/2069
USPC .... 714/6.1, 6.11, 6.12, 6.13, 6.21, 6.24, 6.3, 714/6.32
See application file for complete search history.

(56) References Cited

U.S. PATENT DOCUMENTS

| 6,052,759 | A * | 4/2000 | Stallmo ................ | G06F 3/0607 711/114 |
| 6,327,672 | B1 * | 12/2001 | Wilner ................ | G06F 11/1076 711/114 |
| 7,308,599 | B2 * | 12/2007 | Patterson ............ | G06F 11/1092 711/114 |
| 7,941,695 | B2 * | 5/2011 | Soran .................... | G06F 3/0608 714/6.3 |
| 8,386,889 | B1 * | 2/2013 | Tang .................... | H03M 13/09 714/710 |

* cited by examiner

*Primary Examiner* — Dieu-Minh Le
(74) *Attorney, Agent, or Firm* — Haynes and Boone, LLP

(57) ABSTRACT

A system, method, and computer program product for the banded allocation of storage device address ranges in distributed parity schemes is disclosed. A storage system with storage devices logically divides up the storage devices into bands of contiguous logical block address ranges. A storage controller provisions logical volumes in the bands. Upon unavailability of a storage device, the data pieces are reconstructed at the next available data extent within the same band on the other storage devices. The storage controller detects a replacement drive and logically divides the replacement storage device into the same number of bands as on the other storage devices. The storage controller transfers the reconstructed data pieces to the replacement drive and places the data pieces within the same bands on the replacement drive.

20 Claims, 9 Drawing Sheets

BANDED ALLOCATION OF DEVICE ADDRESS RANGES IN DISTRIBUTED PARITY SCHEMES

TECHNICAL FIELD

The present description relates to data storage and, more specifically, to systems, methods, and machine-readable media for the allocation of storage device address ranges in distributed parity schemes.

BACKGROUND

A storage volume is a grouping of data of any arbitrary size that is presented to a user as a single, unitary storage area regardless of the number of storage devices the volume actually spans. Typically, a storage volume utilizes some form of data redundancy, such as by being provisioned from a redundant array of independent disks (RAID) or a disk pool. In some applications, data is assigned to storage devices within a disk pool typically beginning with those regions of the storage devices that have the best performance. For example, one or more storage devices of the disk pool may be hard drives and the data may be assigned to tracks of the hard drives starting from the outside track and working inward. A user may specifically assign one or more volumes to the outer tracks of the drives in order to achieve the best performance possible for those one or more volumes.

When a storage device fails in a disk pool, the data stored on that failed storage device is reassigned to unallocated (available) space on one or more remaining storage devices in the disk pool. Where the one or more remaining storage devices (or just a subset thereof) are hard drives, this unallocated space is typically on the inner tracks. As a result, data previously kept at or near the outer tracks of the failed storage device is reassigned to inner tracks, resulting in degraded performance of the corresponding volume. This degradation of performance for the volume may affect the system's quality of service in an undesirable manner.

Accordingly, the potential remains for improvements that, for example, result in maintaining a desired volume performance even when a storage device fails within a disk pool and the data on that failed storage device is reassigned to other storage devices within the disk pool.

BRIEF DESCRIPTION OF THE DRAWINGS

The present disclosure is best understood from the following detailed description when read with the accompanying figures.

DETAILED DESCRIPTION

Figure 1:
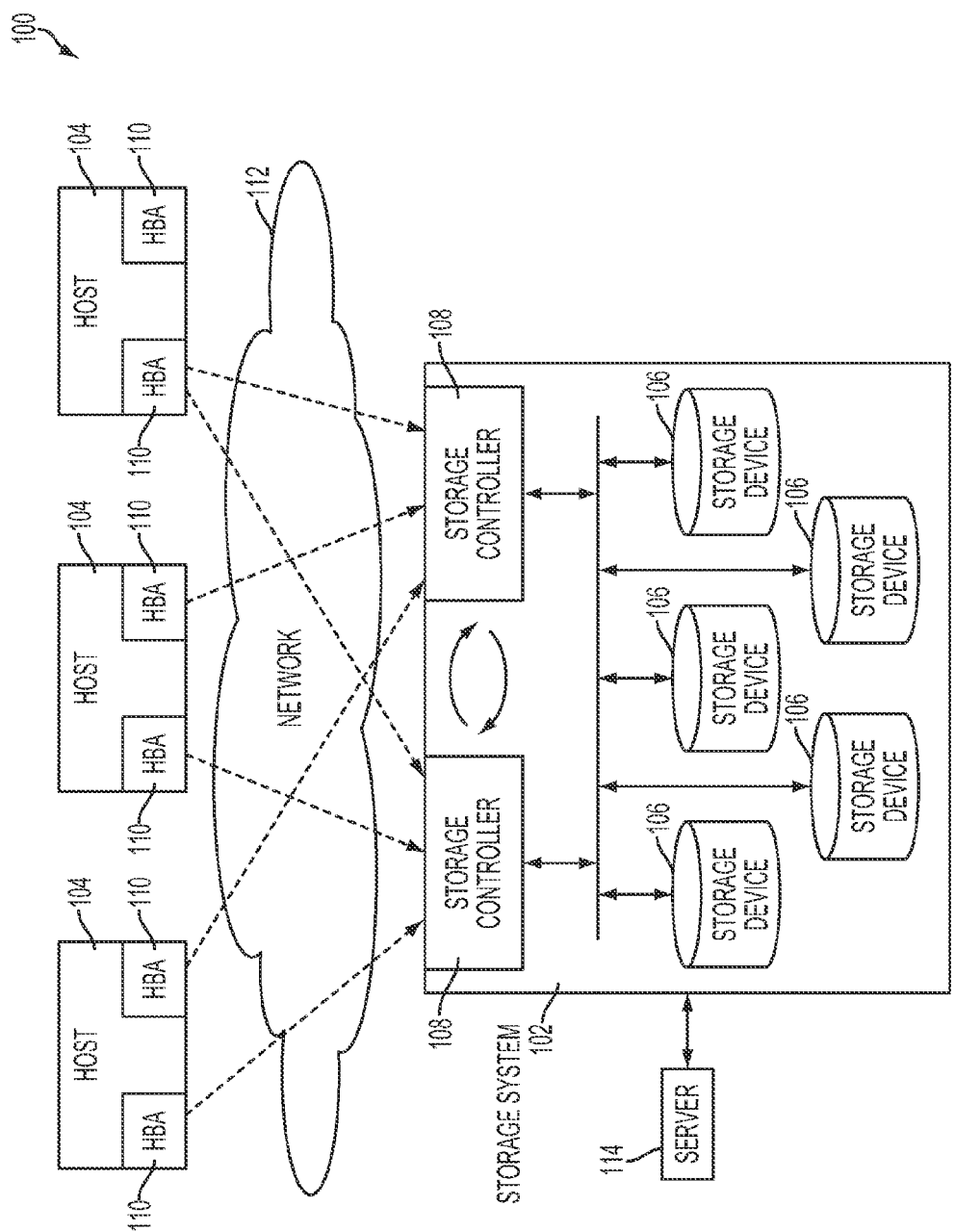
FIG. 1 is an organizational diagram of an exemplary data storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for the banded allocation of storage device address ranges in distributed parity schemes. The techniques described herein enable the volumes in a disk pool to maintain a general level of service even after any given storage device fails. In an example, a storage system allocates data extents of a storage volume within a band spanning the storage devices that may represent physical locations with similar performance characteristics. The storage controller may receive information from a server, and use that information to determine the number of bands to logically divide the storage devices of a disk pool into, or receive the determined number of bands directly from, the server. The storage controller then logically divides up the storage devices into the number of bands, such that there are sequential groups of data extents (e.g., in contiguous logical block address ranges) in each band. For example, where the storage devices are hard disk drives, the bands may correspond to tracks ranging from an outer edge of the drives toward the center of the drives.

With the storage devices logically divided into the number of bands, in the example the storage controller then provisions one or more logical volumes in the bands. For example, each band may be used for only one logical volume or alternatively may have more than one volume. There may be just enough bands for the number of requested volumes, or more bands than currently requested volumes. In operation any given storage device may fail. Upon failure of a storage device, the storage controller reconstructs the data pieces (of each volume in each corresponding band) in the same band on other storage devices within the disk pool. For example, using a random algorithm the storage controller may assign the data pieces of the failed storage device to other storage devices. The data pieces are reconstructed at the next available (unassigned) data extent within the same band on the other storage devices. As a result, the data pieces are reconstructed at data extents that are sufficiently close (e.g., in the same band) so as to not affect the overall performance of the volume(s).

The failed storage device may at some point be replaced. The storage controller detects a replacement storage device and logically divides the replacement storage device into the same number of bands as on the other storage devices within the disk pool. The storage controller transfers the reconstructed data pieces to the replacement storage device. As part of this transfer, the storage controller looks at each data piece's band and places the data pieces within the same bands on the replacement storage device. After transfer, the storage controller de-allocates the corresponding data extents that held the reconstructed data pieces for future failure/recovery needs.

A data storage architecture 100 is described with reference to FIG. 1. The storage architecture 100 includes a storage system 102 in communication with a number of hosts 104. The storage system 102 is a system that processes data transactions on behalf of other computing systems including one or more hosts, exemplified by the hosts 104. The storage system 102 may receive data transactions (e.g., requests to read and/or write data) from one or more of the hosts 104, and take an action such as reading, writing, or otherwise accessing the requested data. For many exemplary transactions, the storage system 102 returns a response such as requested data and/or a status indictor to the requesting host 104. It is understood that for clarity and ease of explanation, only a single storage system 102 is illustrated, although any number of hosts 104 may be in communication with any number of storage systems 102.

While the storage system 102 and each of the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor such as a microcontroller or a central processing unit (CPU) operable to perform various computing instructions. The processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106 and responds to one or more hosts 104's data transactions so that the storage devices 106 appear to be directly connected (local) to the hosts 104. In various examples, the storage devices 106 include hard disk drives (HDDs), solid state drives (SSDs), optical drives, and/or any other suitable volatile or non-volatile data storage medium. In some embodiments, the storage devices 106 are relatively homogeneous (e.g., having the same manufacturer, model, and/or configuration). However, it is also common for the storage system 102 to include a heterogeneous set of storage devices 106 that includes storage devices of different media types from different manufacturers with notably different performance.

The storage system 102 may group the storage devices 106 for speed and/or redundancy using a virtualization technique such as RAID (Redundant Array of Independent/Inexpensive Disks). The storage system may also arrange the storage devices 106 hierarchically for improved performance by including a large pool of relatively slow storage devices and one or more caches (i.e., smaller memory pools typically utilizing faster storage media). Portions of the address space may be mapped to the cache so that transactions directed to mapped addresses can be serviced using the cache. Accordingly, the larger and slower memory pool is accessed less frequently and in the background. In an embodiment, a storage device includes HDDs, while an associated cache includes SSDs.

In an embodiment, the storage system 102 may group the storage devices 106 using a dynamic disk pool virtualization technique. In a dynamic disk pool, volume data, protection information, and spare capacity is distributed across all of the storage devices included in the pool. As a result, all of the storage devices in the dynamic disk pool remain active, and spare capacity on any given storage device is available to all volumes existing in the dynamic disk pool. Each storage device in the disk pool is logically divided up into one or more data extents at various logical block addresses (LBAs) of the storage device. A data extent is assigned to a particular data stripe of a volume. An assigned data extent becomes a "data piece," and each data stripe has a plurality of data pieces, for example sufficient for a desired amount of storage capacity for the volume and a desired amount of redundancy, e.g. RAID 5 or RAID 6. As a result, each data stripe appears as a mini RAID volume, and each logical volume in the disk pool is typically composed of multiple data stripes.

The storage system 102 also includes one or more storage controllers 108 in communication with the storage devices 106 and any respective caches. The storage controllers 108 exercise low-level control over the storage devices in order to execute (perform) data transactions on behalf of one or more of the hosts 104. The storage system 102 may also be communicatively coupled to a user display for displaying diagnostic information, application output, and/or other suitable data.

For example, the storage system 102 is communicatively coupled to server 114. The server 114 includes at least one computing system, which in turn includes a processor, for example as discussed above. The computing system may also include a memory device such as one or more of those discussed above, a video controller, a network interface, and/or a user I/O interface coupled to one or more user I/O devices. While the server 114 is referred to as a singular entity, the server 114 may include any number of computing devices and may range from a single computing system to a system cluster of any size.

With respect to the hosts 104, a host 104 includes any computing resource that is operable to exchange data with a storage system 102 by providing (initiating) data transactions to the storage system 102. In an exemplary embodiment, a host 104 includes a host bus adapter (HBA) 110 in communication with a storage controller 108 of the storage system 102. The HBA 110 provides an interface for communicating with the storage controller 108, and in that regard, may conform to any suitable hardware and/or software protocol. In various embodiments, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. The HBAs 110 of the hosts 104 may be coupled to the storage system 102 by a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, or the like. In many embodiments, a host 104 has multiple communicative links with a single storage system 102 for redundancy. The multiple links may be provided by a single HBA 110 or multiple HBAs 110 within the hosts 104. In some embodiments, the multiple links operate in parallel to increase bandwidth.

To interact with (e.g., read, write, modify, etc.) remote data, a host HBA 110 sends one or more data transactions to the storage system 102. Data transactions are requests to read, write, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by reading, writing, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

Data transactions are often categorized as either block-level or file-level. Block-level protocols designate data locations using an address within the aggregate of storage devices 106. Suitable addresses include physical addresses, which specify an exact location on a storage device, and virtual addresses, which remap the physical addresses so that a program can access an address space without concern for how it is distributed among underlying storage devices 106 of the aggregate. Exemplary block-level protocols include iSCSI, Fibre Channel, and Fibre Channel over Ethernet (FCoE). iSCSI is particularly well suited for embodiments where data transactions are received over a network that includes the Internet, a Wide Area Network (WAN), and/or a Local Area Network (LAN). Fibre Channel and FCoE are well suited for embodiments where hosts 104 are coupled to the storage system 102 via a direct connection. A Storage Attached Network (SAN) device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage system 102 to translate the file name into respective memory addresses. Exemplary file-level protocols include SMB/CFIS, SAMBA, and NFS. A Network Attached Storage (NAS) device is a type of storage system that responds to file-level transactions. It is understood that the scope of present disclosure is not limited to either block-level or file-level protocols, and in many embodiments, the storage system 102 is responsive to a number of different memory transaction protocols.

In an embodiment, the server 114 may also provide data transactions to the storage system 102. Further, the server 114 may be used to configure various aspects of the storage system 102, for example under the direction and input of a user. Some configuration aspects may include definition of RAID group(s), disk pool(s), and volume(s), to name just a few examples. In an embodiment, the server 114 may store instructions, for example in one or more memory devices. The instructions may, when executed by a processor for example in association with an application running at the server 114, cause the processor to perform the operations described herein to provide the configuration information to the storage controllers 108 in the storage system 102 in connection with embodiments of the present disclosure. Instructions may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

For example, a user at the server 114 may utilize one or more applications to set up a disk pool and specify a number of volumes to exist as part of that disk pool. The user may further specify a desired quality of service level for one or more of the volumes of the disk pool. The user may also specify, according to aspects of the present disclosure, how many bands to allocate per disk pool (and, therefore, per storage device) as well as how much unallocated space to preserve in each band. The server 114 provides its instructions to the storage controllers 108, which in turn are operable to set up and define the disk pool(s), volume(s), and storage devices as instructed by the server 114.

Figure 2A:
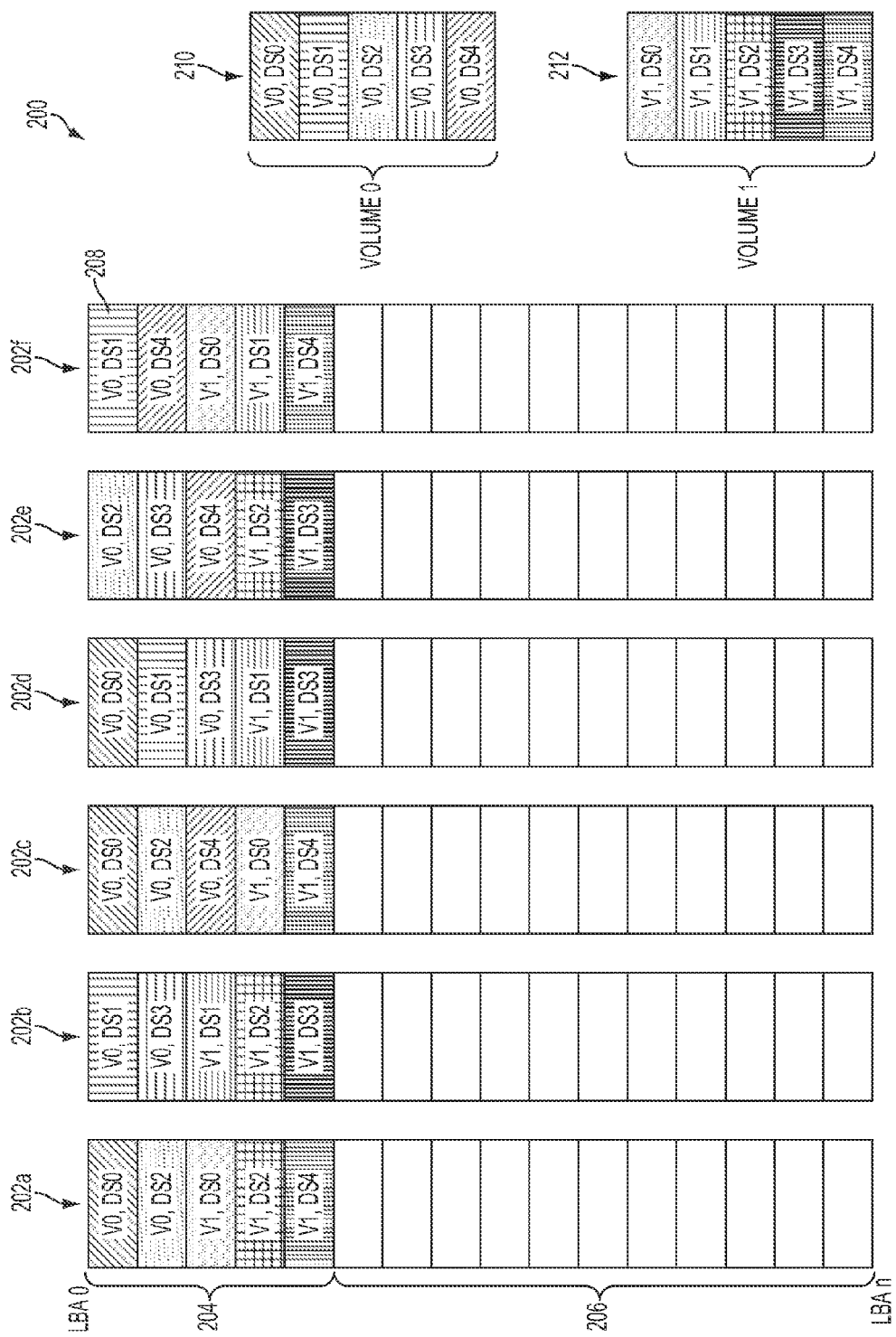
FIG. 2A is an organizational diagram of a data pool architecture according to aspects of the present disclosure.

FIG. 2A is an organizational diagram of a data pool architecture 200 according to aspects of the present disclosure. The data pool architecture 200 illustrates the allocation of data extents from storage devices 202a-202f into two logical volumes 210 and 212. It will be recognized that more or fewer storage devices, volumes, and/or data extent divisions are possible than those illustrated in FIG. 2A. In an embodiment, one or more of the storage devices 202a-202f may be a hard disk drive with multiple tracks, for example as illustrated in FIG. 2C.

Figure 2B:
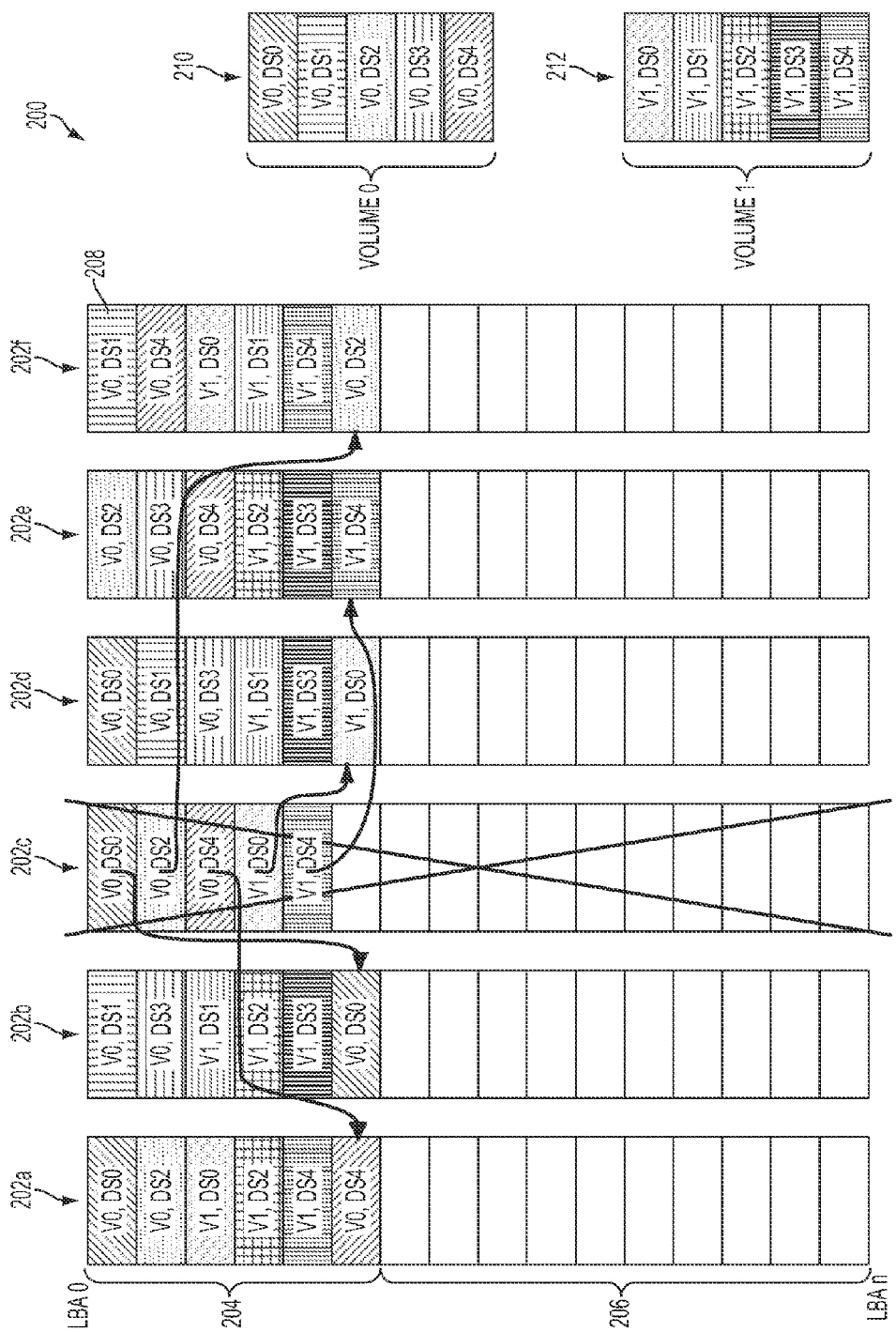
FIG. 2B is an organizational diagram of a data pool architecture after failure of a storage device according to aspects of the present disclosure.
Figure 2C:
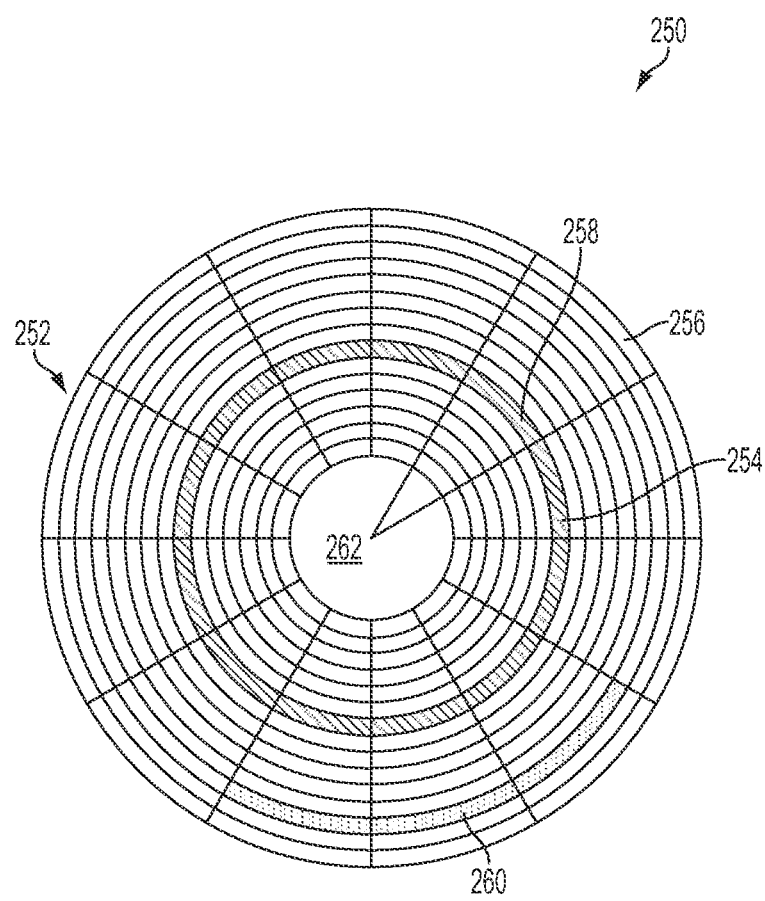
FIG. 2C is a diagram of a storage device according to aspects of the present disclosure.

As can be seen in FIG. 2C, data may be stored on a hard disk drive 250 in tracks and sectors arranged on the cylindrical platters of the drive. The hard disk drive 250 may include outer edge 252, tracks 254, sectors 256, track sectors 258, cluster 260, and center 262. As can be seen in FIG. 2C, tracks 254 extend from the outer edge 252 toward the center 262 of the platters of the hard disk drive 250. Because of the geometry of the platters, data stored closer to the outer edge 252 may be accessible much quicker than data stored closer to the center 262. The plurality of tracks 254 may be logically divided into a plurality of data extents, where each data extent includes a range of logical block addresses. In an embodiment, the lowest LBAs are located at the track 254 nearest the outer edge 252, while the highest LBAs are located at the track 254 nearest the center 262.

Returning now to FIG. 2A, each storage device 202a-202f is logically divided up into a plurality of data extents 208. Of that plurality of data extents, each storage device 202a-202f includes a subset of data extents that has been allocated for use by one or more logical volumes, illustrated as data pieces 204 in FIG. 2A, and another subset of data extents that remains unallocated, illustrated as unallocated extents 206 in FIG. 2A. As shown, the volumes 210 and 212 are composed of multiple data stripes, each having multiple data pieces. For example, volume 210 is composed of 5 data stripes (V0:DS0 through V0:DS4) and volume 212 is composed of 5 data stripes as well (V1:DS0 through V1:DS4). Referring to DS0 of V0 (representing Data Stripe 0 of Volume 0, referred to as volume 210), it can be seen that there are three data pieces shown for purposes of illustration only. Of these data pieces, at least one is reserved for redundancy (e.g., according to RAID 5) and the others used for data. It will be appreciated that the other data stripes may have similar composition, but for simplicity of discussion will not be discussed here.

As illustrated in FIG. 2A, the data stripes that volume 210 is composed of reside at the lowest LBAs of all of the storage devices 202a-202f, corresponding to being physically located at the outer edges of the tracks on the storage devices 202a-202f. As a result, the volume 210 may have better performance characteristics than volume 212, whose data stripes reside at higher LBAs corresponding to being physically located at tracks closer toward the centers of the storage devices 202a-202f.

Turning now to FIG. 2B, an organizational diagram 200 of a data pool architecture after failure of a storage device is illustrated. In the example shown in FIG. 2B, storage device 202c fails. As will be recognized, this is exemplary only for ease of illustration and is representative of any of the storage devices 202a-202f failing. In response to the storage device 202c failing, a storage controller, such as one or more storage controllers 108 illustrated in FIG. 1, reconstructs each of the data pieces from the data pieces 204 on the storage device 202c at unallocated extents 206 of other storage devices 202a, 202b, 202d, 202e, and 202f. There may be embodiments where not every storage device is necessary to reconstruct data pieces from a failed storage device. Reconstruction of data pieces on the failed storage device 202c may occur according to various techniques, for example according to one or more RAID techniques as will be recognized.

In the example shown in FIG. 2B, data piece V0:DS0 is reconstructed at the next available data extent (located in the unallocated extents 206) of storage device 202b, data piece V0:DS2 at the next available data extent of storage device 202f, data piece V0:DS4 at the next available data extent of storage device 202a, data piece V1:DS0 at the next available data extent of storage device 202d, and the data piece V1:DS4 at the next available data extent of storage device 202e. Reassignment may be made according to an algorithm implemented by the storage controller 108. The algorithm may be, for example, a pseudo-random algorithm that randomly assigns the reassigned location. The algorithm may, in the alternative, have a pre-determined reassignment for each data piece on each storage device. In an embodiment, no given storage device may contain multiple data pieces from the same data stripe.

As illustrated in FIG. 2B, when data pieces of the different data stripes are reassigned to the next available data extents from among unallocated extents 206, the corresponding volumes suffer a degradation in performance. For example, volume 210, which includes the V0:DS0 data stripe, suffers a degradation in performance when the data piece V0:DS0 on the failed storage device 202c is reconstructed at a higher LBA on storage device 202b. In the example shown, the data piece V0:DS0 on storage device 202c is located at a low LBA corresponding to an outer track of the physical device, while after reconstruction on storage device 202b it is now located at a higher LBA corresponding to a more inner track of the physical device closer to the storage device 202b's center.

Figure 3A:
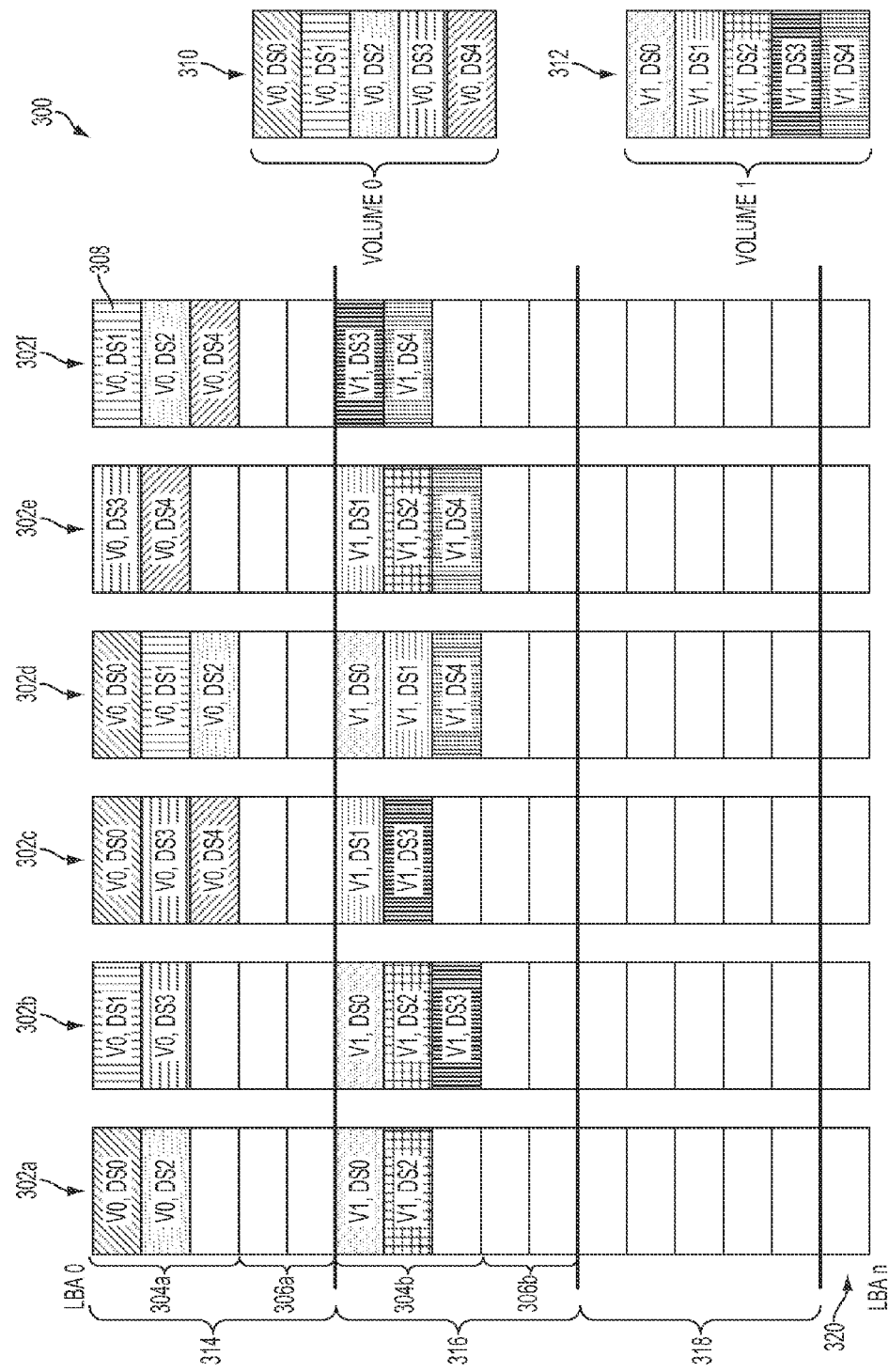
FIG. 3A is an organizational diagram of an exemplary data pool architecture according to aspects of the present disclosure.

To address these limitations, FIG. 3A illustrates an organizational diagram of an exemplary data pool architecture 300 according to aspects of the present disclosure. As shown in FIG. 3A, according to embodiments of the present disclosure each storage device 302a-302f is logically divided into pluralities of data extents 308 and multiple bands. In FIG. 3A specifically, the storage devices 302a-302f are each logically divided into band 314 which includes LBAs corresponding to tracks near the outer edge of the physical storage device, band 316 which includes LBAs corresponding to tracks at a middle portion of the physical storage device, band 318 which includes LBAs corresponding to tracks at a portion towards a center of the physical device, and band 320 which includes LBAs corresponding to tracks near the center of the physical device. Bands 314-320 are for illustrative purpose only—as will be recognized, more or fewer bands may be used as necessary or desired. For example, each band may correspond to a different logical volume as specified by a user, e.g. as provided in an instruction from the server 114 of FIG. 1, or may correspond to more than one logical volume.

In an embodiment, the storage controller 108 may receive instruction from the server 114 to logically divide the LBAs of each storage device into as many bands as there are requested volumes. In another embodiment, and as illustrated in FIG. 3A, the storage devices 302a-302f may be logically divided into a number of bands that exceeds the number of requested volumes. In such embodiments, the number of bands may be explicitly specified by the user at the server 114, for example according to a projected number of volumes that are needed at the present time and any more that are anticipated to be necessary at some point in the future. Alternatively, the number of bands may be determined by the server 114 or the storage controller 108 according to a specified amount of unallocated space requested for the disk pool, for example so that the amount of unallocated space per band (and, as shown, per volume) corresponds to the amount of storage space in a given storage device or multiple storage devices. Other ways in which to allocate space per band may be used, as will be recognized.

As illustrated in FIG. 3A, volume 310 is allocated in the band 314, specifically in the data pieces 304a, leaving unallocated extents 306a within the band 314 for future reconstruction needs as will be illustrated in more detail as discussed with respect to FIG. 3B below. Volume 312 is allocated in the band 316, specifically in the data pieces 304b, leaving unallocated extents 306b within the band 316 for future reconstruction needs. Since there are two volumes illustrated in FIG. 3A (volumes 310 and 312), the remaining bands 318 and 320 remain unallocated. They may become allocated in the future, for example, when additional volumes are requested to be created and they do not have quality of service requirements that would preclude them from being provisioned on bands 318 and/or 320.

As can be seen in FIG. 3A, the data pieces corresponding to volume 310 are all kept within the same band, band 314. As a result, all of the data pieces of the volume 310 are located at the same general range of LBAs of the storage devices 302a-302f (near the outer edge of the storage devices), providing a consistent quality of service level. Further, all of the data pieces of the volume 312 are located at the same general range of LBAs of the storage devices 302a-302f in the band 316 (further inward from the outer edge of the storage devices).

Figure 3B:
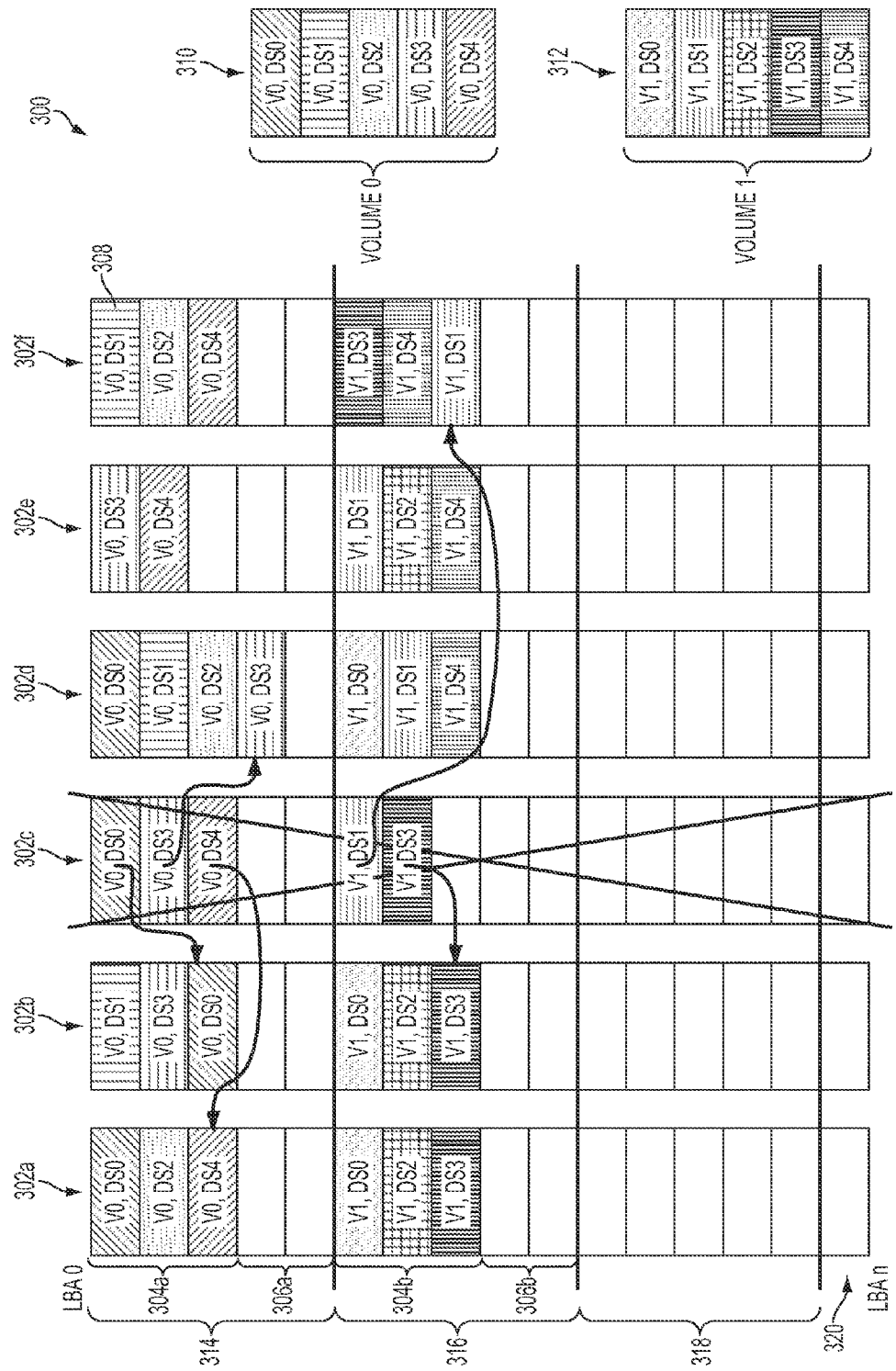
FIG. 3B is an organizational diagram of an exemplary data pool architecture after failure of a storage device according to aspects of the present disclosure.

Turning now to FIG. 3B, an organizational diagram of an exemplary data pool architecture 300 after failure of a storage device according to aspects of the present disclosure is illustrated. FIG. 3B illustrates storage device 302c failing, which is exemplary only for purposes of illustration. In response to the storage device 302c failing, the storage controller 108 reconstructs each of the data pieces from the data pieces 304a on the storage device 302c at unallocated extents 306a of other storage devices 302a, 302b, 302d, 302e, and 302f within the band 314. There may be embodiments where not every storage device is necessary to reconstruct data pieces from a failed storage device. Reconstruction of data pieces on the failed storage device 302c may occur according to various techniques, for example according to one or more RAID techniques as will be recognized.

In the example shown in FIG. 3B, data piece V0:DS0 is reconstructed at the next available data extent (located in the unallocated extents 306a) of storage device 302b, data piece V0:DS3 at the next available data extent of storage device 302d, and data piece V0:DS4 at the next available data extent of storage device 302a, all within the same band 314. As a result, all of the data pieces for volume 310 on failed storage device 302c are kept within the same general range of LBAs to better maintain a desired quality of service level. Further, data piece V1:DS1 is reconstructed at the next available data extent of storage device 302f, and the data piece V1:DS3 at the next available data extent of storage device 302b, all within the same band 316. As a result, all of the data pieces for volume 312 on failed storage device 302c are kept within the same general range of LBAs in band 316 to better maintain the desired quality of service level. Reassignment may be made according to an algorithm implemented by the storage controller 108. The algorithm may be, for example, a pseudo-random algorithm that randomly assigns the reassigned location. The algorithm may, in the alternative, have a pre-determined re-assignment for each data piece on each storage device. In an embodiment, no given storage device may contain multiple data pieces from the same data stripe.

Figure 4:
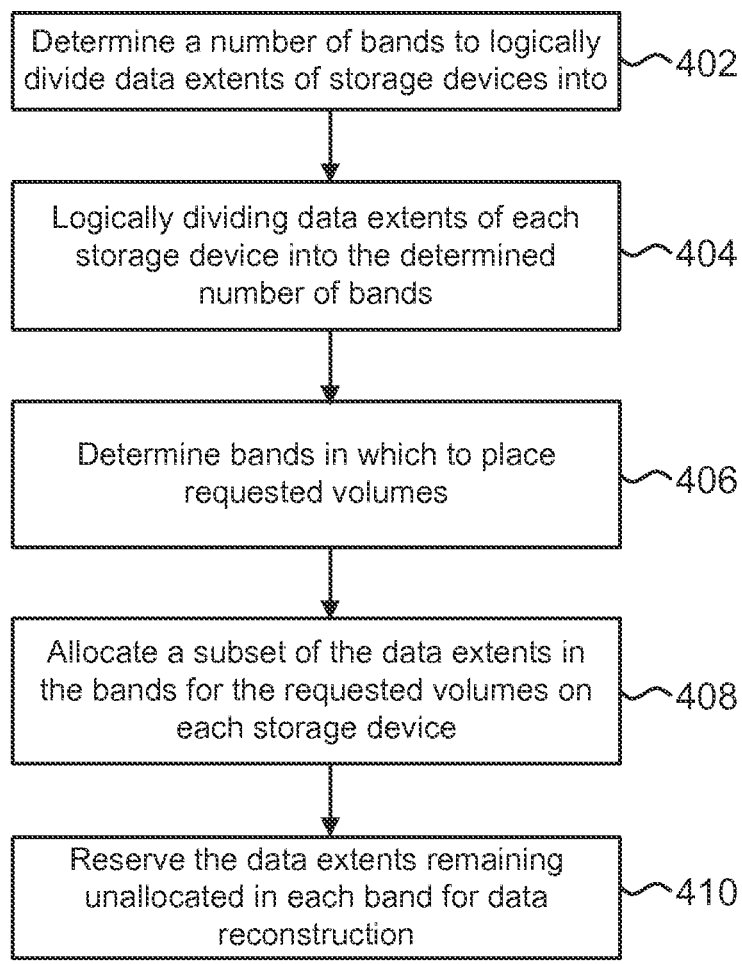
FIG. 4 is a flow diagram of a method of allocating bands in an exemplary data storage architecture according to aspects of the present disclosure.

Turning now to FIG. 4, a flow diagram is illustrated of a method 400 of allocating bands in an exemplary data storage architecture, for example data storage architecture 100 described above. In an embodiment, the method 400 may be implemented by one or more storage controllers 108 of the storage system 102. It is understood that additional steps can be provided before, during, and after the steps of method 400, and that some of the steps described can be replaced or eliminated for other embodiments of the method 400.

At step 402, the storage controller 108 determines a number of bands into which each storage device 106 will be logically divided. In an embodiment based on disk pools, the storage controller 108 makes this determination based on a desired amount of unallocated (reconstruction) space for each band, e.g. a storage space equivalent of one storage device, two storage devices, etc. across a given band. In another embodiment, the storage controller 108 may receive a requested number of bands from the server 114, for example in response to the server 114 calculating the size based on the requested amount of unallocated space per band. The number of bands determined may reflect the number of volumes requested to be provisioned within the given disk pool. Alternatively, the number of bands may be determined independent of the number of desired volumes, e.g. so that there are more bands than currently desired volumes.

At step 404, the storage controller 108 logically divides the data extents of each storage device 106 within the given disk pool (e.g., all of the storage devices 106 within the storage system 102 or some subset thereof, such as where multiple disk pools may be desired) into the determined number of bands from step 402. Each data extent corresponds to a range of LBAs, as discussed above.

At step 406, the storage controller 108 determines which bands in which to place the requested volumes. For example, the storage controller 108 may receive information regarding the number of volumes and desired quality of service levels for each volume from the server 114. The storage controller 108 may determine which volumes should be placed in which bands, e.g. based on the corresponding physical locations on the tracks of the storage devices 106, or the determination may be made beforehand at the server 114.

At step 408, the storage controller 108 allocates a subset of the data extents within the determined bands from step 406 for the corresponding volume. This allocation may include the insertion of identifying information that changes the system's view of the given data extent from an unallocated data extent to an allocated data piece of the corresponding volume. For any given band, there may be multiple data pieces that each correspond to a different data stripe, where the corresponding volume is composed of multiple data stripes within the band.

At step 410, the storage controller 108 reserves the remaining data extents in each band as unallocated data extents. These unallocated data extents may be subsequently used when a storage device fails as the location where the data pieces from the failed storage device are reconstructed either temporarily or permanently.

Figure 5:
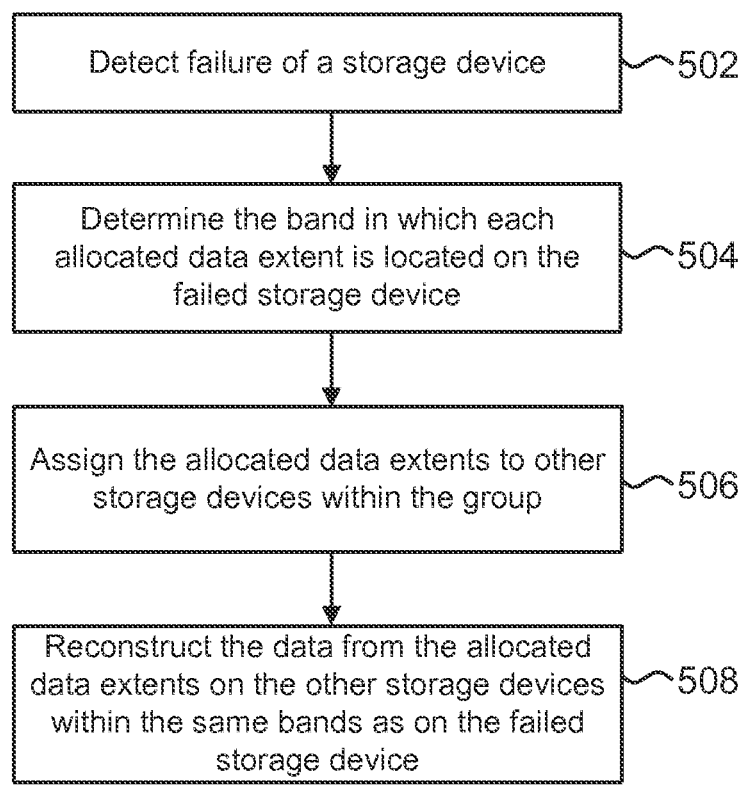
FIG. 5 is a flow diagram of a method of data recovery according to aspects of the present disclosure.

After band allocation, embodiments of the present disclosure may be used for data reconstruction that maintains a desired quality of service level as illustrated in FIG. 5's method 500. In an embodiment, the method 500 may be implemented by one or more storage controllers 108 of the storage system 102. It is understood that additional steps can be provided before, during, and after the steps of method 500, and that some of the steps described can be replaced or eliminated for other embodiments of the method 500.

At step 502, the storage controller 108 detects the failure of a storage device, such as storage device 302c from the example of FIG. 3B discussed above.

At step 504, the storage controller 108 determines the band in which each data piece (allocated data extent) is located within the failed storage device. For example, looking at FIG. 3B, the storage controller 108 may determine that data pieces V0:DS0, V0:DS3, and V0:DS4 are in the first band 314, while the data pieces V1:DS1 and V1:DS3 are in the second band 316, where the bands were created, for example, according to the method 400 of FIG. 4.

At step 506, the storage controller 108 assigns the data pieces from the failed storage device to other storage devices in the group (e.g., disk pool). The storage controller 108 may assign the data pieces according to a pseudo-random algorithm or according to a pre-determined assignment schedule based on what storage device failed.

At step 508, the storage controller 108 reconstructs the data pieces from the failed storage device on the storage devices assigned from step 506. For example, at each assigned storage device, the assigned data piece may be placed at the next available data extent in the same band. Reconstruction may occur according to various techniques, for example according to one or more RAID techniques as will be recognized. As a result, all of the data pieces for each volume on the failed storage device are kept within the same general range of LBAs (the same bands) to better maintain a desired quality of service level for each volume within the disk pool.

Figure 6:
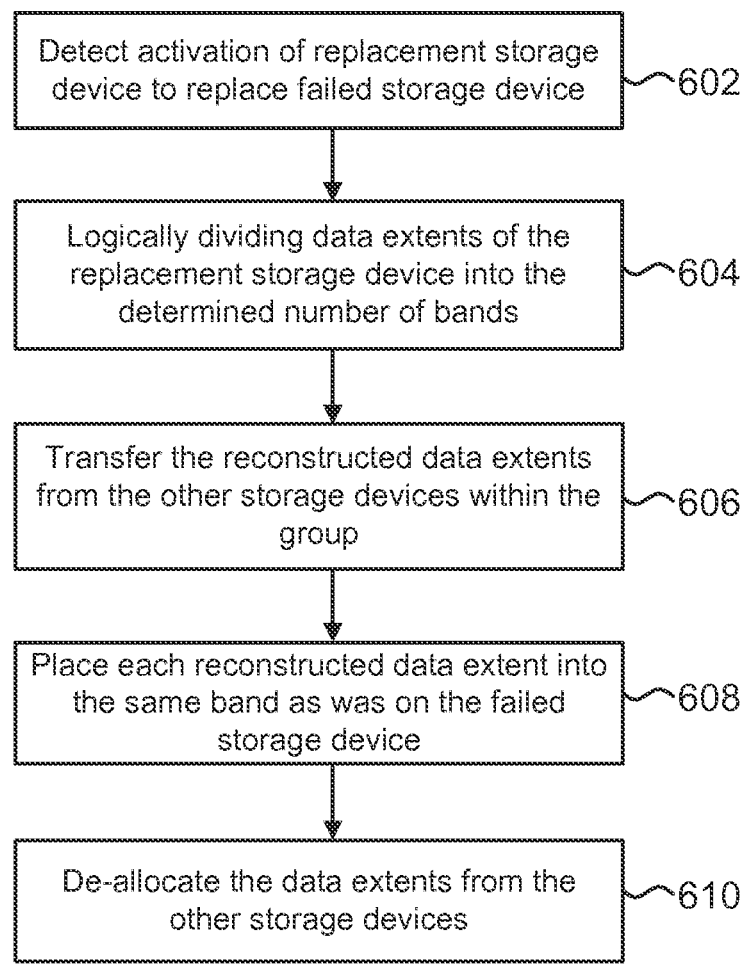
FIG. 6 is a flow diagram of a method of storage device replacement according to aspects of the present disclosure.

After reconstruction of data pieces on other storage devices in a disk pool, embodiments of the present disclosure may be used with respect to storage device replacement as illustrated in the method 600 of FIG. 6. In an embodiment, the method 600 may be implemented by one or more storage controllers 108 of the storage system 102. It is understood that additional steps can be provided before, during, and after the steps of method 600, and that some of the steps described can be replaced or eliminated for other embodiments of the method 600.

At step 602, the storage controller 108 detects the insertion and/or activation of a replacement storage device to replace a failed storage device. This may occur while reconstruction is performed on the remaining storage devices of the disk pool or at some point after it has occurred. The storage controller 108 may manage the steps of storage device configuration and formatting for the replacement storage device.

At step 604, the storage controller 108 logically divides the data extents of the replacement storage device into the determined number of bands, for example as determined previously according to one or more steps of method 400 discussed above. For example, the storage controller 108 may have previously stored the determined number of bands for reference, or alternatively may check the number of bands existing on the remaining storage devices of the disk pool.

At step 606, the storage controller 108 transfers the reconstructed data pieces from the temporary locations at other storage devices within the disk pool to the replacement storage device.

At step 608, the storage controller 108 places each reconstructed data piece into the same band as on the failed storage device. For example, the storage controller 108 may place each reconstructed data piece into the next available data extent within the same band as that data piece was located on the failed storage device and temporary storage device. All of the reconstructed data pieces from the failed storage device are placed in the same bands at the next available data extent. In an embodiment, the storage controller 108 may place the reconstructed data pieces of a given band (and, therefore, volume) in the same order within the band as previously existed on the failed storage device. This may be accomplished, for example, based on metadata regarding each storage device that is maintained by the storage controller 108 over time or as needed/triggered (e.g. by the failure of a storage device). Alternatively, the storage controller 108 may place the reconstructed data pieces in any order within the given band, so as to still maintain a comparable quality of service level.

At step 610, the storage controller 108 de-allocates the data extents on the other storage devices of the disk pool that were used for reconstructing the data pieces from the failed storage device. This is done in response to the data of each reconstructed data piece being transferred to the replacement storage device. The storage controller 108 de-allocates these data extents so that they again become unallocated data extents that can be used again to handle the data load from storage device failures.

The present embodiments can take the form of an entirely hardware embodiment, an entirely software embodiment, or an embodiment containing both hardware and software elements. In that regard, in some embodiments, the computing system is programmable and is programmed to execute processes including those associated with performing band allocation on storage devices within a disk pool, data reconstruction upon a storage device failure, and storage device replacement such as the processes of methods 400, 500, and/or 600 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and Random Access Memory (RAM).

Thus, the present disclosure provides system, methods, and computer-readable media for the banded allocation of storage device address ranges in distributed parity schemes. In some embodiments, the method includes detecting, at a storage controller, unavailability of a storage device from among a plurality of storage devices, wherein the plurality of storage devices has associated therewith one or more logical volumes, and wherein each storage device comprises a plurality of bands, a plurality of data extents allocated to the one or more logical volumes, and a plurality of unallocated data extents. The storage controller determines a corresponding band from among the plurality of bands in which each allocated data extent is located on the unavailable storage device. The storage controller then reconstructs the allocated data extents from the unavailable storage device and stores the reconstructed data extents on at least a remaining subset of the plurality of storage devices in the same determined band as on the unavailable storage device.

In further embodiments, the computing device includes a memory containing machine readable medium comprising machine executable code having stored thereon instructions for performing a method of storage device banding; and a processor coupled to the memory. The processor is configured to execute the machine executable code to detect a unavailability of a storage device from among a plurality of storage devices, wherein the plurality of storage devices has associated therewith one or more logical volumes, and wherein each storage device comprises a plurality of bands, a plurality of data extents allocated to the one or more logical volumes, and a plurality of unallocated data extents. The processor is also configured to determine a corresponding band from among the plurality of bands in which each allocated data extent is located on the unavailable storage device. The processor is also configured to reconstruct the allocated data extents from the unavailable storage device and store the reconstructed data extents on at least a remaining subset of the plurality of storage devices in the same determined bands as on the unavailable storage device.

In yet further embodiments a non-transitory machine readable medium having stored thereon instructions for performing a method of storage device banding comprises machine executable code. When executed by at least one machine, the code causes the machine to detect unavailability of a storage device from among a plurality of storage devices, wherein the plurality of storage devices has associated therewith one or more logical volumes and wherein each storage device comprises a plurality of bands, a plurality of data extents allocated to the one or more logical volumes, and a plurality of unallocated data extents. The code also causes the machine to determine a band from among the plurality of bands in which each allocated data extent is located on the unavailable storage device. The code also causes the machine to reconstruct the allocated data extents from the unavailable storage device on at least a remaining subset of the plurality of storage devices, each allocated data extent being reconstructed in the same determined band as on the unavailable storage device.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   detecting, at a storage controller, unavailability of a storage device from among a plurality of storage devices, wherein the plurality of storage devices has associated therewith one or more logical volumes, and wherein each storage device comprises a plurality of bands having same logical block address (LBA) ranges as a remainder of the plurality of storage devices, a plurality of data extents allocated to the one or more logical volumes, and a plurality of unallocated data extents;
   determining, by the storage controller, a corresponding band from among the plurality of bands in which each allocated data extent is located on the unavailable storage device;
   reconstructing, by the storage controller, the allocated data extents from the unavailable storage device; and
   storing the reconstructed data extents on at least a remaining subset of the plurality of storage devices in the same determined bands as on the unavailable storage device.

2. The method of claim 1, further comprising:
   receiving a requested number of bands into which to logically divide each of the plurality of storage devices, wherein each band represents a quality-of-service range; and
   logically dividing each of the plurality of storage devices into the requested number of bands to result in the plurality of bands, each band comprising a subset of the plurality of allocated data extents and a subset of the plurality of unallocated data extents,
   wherein each logical volume from among the one or more logical volumes is allocated to a different band from among the plurality of bands.

3. The method of claim 2, further comprising:
   receiving a requested amount of reconstruction capacity;
   determining an amount for the subset of the plurality of unallocated data extents in each band on each storage device to accommodate the requested amount of reconstruction capacity; and
   reserving the determined amount for the subset of the plurality of unallocated data extents in each band on each storage device for reconstruction.

4. The method of claim 2, wherein one or more of the plurality of storage devices comprises a hard drive having a plurality of tracks, the logically dividing further comprising:
   assigning each band to a different subset of the plurality of tracks, wherein each band extends consecutively from an outer portion of the hard drive toward an inner portion of the hard drive.

5. The method of claim 1, further comprising:
   detecting a replacement storage device that replaces the unavailable storage device; and
   logically dividing the replacement storage device into the plurality of bands.

6. The method of claim 5, further comprising:
   transferring the reconstructed data extents from the remaining subset of the plurality of storage devices to the replacement storage device; and
   storing each reconstructed data extent in the same determined band on the replacement storage device as on the unavailable storage device.

7. The method of claim 6, further comprising:
   de-allocating the data extents on the remaining subset of the plurality of storage devices.

8. A computing device comprising:
   a memory containing a machine readable medium comprising machine executable code having stored thereon instructions for performing a method of storage device banding; and
   a processor coupled to the memory, the processor configured to execute the machine executable code to cause the processor to:
      detect unavailability of a storage device from among a plurality of storage devices, wherein the plurality of storage devices has associated therewith one or more logical volumes, and wherein each storage device comprises a plurality of bands having same logical block address (LBA) ranges as a remainder of the plurality of storage devices, a plurality of data extents allocated to the one or more logical volumes, and a plurality of unallocated data extents;
      determine a corresponding band from among the plurality of bands in which each allocated data extent is located on the unavailable storage device;
      reconstruct the allocated data extents from the unavailable storage device; and
      storing the reconstructed data extents on at least a remaining subset of the plurality of storage devices in the same determined bands as on the unavailable storage device.

9. The computing device of claim 8, wherein the processor is further configured to execute the machine executable code to:
   receive a requested number of bands into which to logically divide each of the plurality of storage devices, wherein each band represents a quality-of-service range; and
   logically divide each of the plurality of storage devices into the requested number of bands to result in the plurality of bands, each band comprising a subset of the plurality of allocated data extents and a subset of the plurality of unallocated data extents,
   wherein each logical volume from among the one or more logical volumes is allocated to a different band.

10. The computing device of claim 9, wherein the processor is further configured to execute the machine executable code to:
    receive a requested amount of reconstruction capacity;
    determine an amount for the subset of the plurality of unallocated data extents in each band on each storage device to accommodate the requested amount of reconstruction capacity; and
    reserve the determined amount for the subset of the plurality of unallocated data extents in each band on each storage device for reconstruction.

11. The computing device of claim 9, wherein one or more of the plurality of storage devices comprises a hard drive having a plurality of tracks and the processor is further configured to execute the machine executable code to:
    assign each band to a different subset of the plurality of tracks, wherein each band extends consecutively from an outer portion of the hard drive toward an inner portion of the hard drive.

12. The computing device of claim 8, wherein the processor is further configured to execute the machine executable code to:
  detect a replacement storage device that replaces the unavailable storage device; and
  logically divide the replacement storage device into the plurality of bands.

13. The computing device of claim 12, wherein the processor is further configured to execute the machine executable code to:
  transfer the reconstructed data extents from the remaining subset of the plurality of storage devices to the replacement storage device; and
  store each reconstructed data extent in the same determined band as on the unavailable storage device.

14. The computing device of claim 13, wherein the processor is further configured to execute the machine executable code to:
  de-allocate the data extents on the remaining subset of the plurality of storage devices.

15. A non-transitory machine readable medium having stored thereon instructions for performing a method of storage device banding, comprising machine executable code which when executed by at least one machine, causes the machine to:
  detect unavailability of a storage device from among a plurality of storage devices, wherein the plurality of storage devices has associated therewith one or more logical volumes, and wherein each storage device comprises a plurality of bands having same logical block address (LBA) ranges as a remainder of the plurality of storage devices, a plurality of data extents allocated to the one or more logical volumes, and a plurality of unallocated data extents;
  determine a corresponding band from among the plurality of bands in which each allocated data extent is located on the unavailable storage device; and
  reconstruct the allocated data extents from the unavailable storage device on at least a remaining subset of the plurality of storage devices, each allocated data extent being reconstructed in the same determined band as on the unavailable storage device.

16. The non-transitory machine readable medium of claim 15, comprising further machine executable code that causes the machine to:
  receive a requested number of bands into which to logically divide each of the plurality of storage devices; and
  logically divide each of the plurality of storage devices into the requested number of bands to result in the plurality of bands, each band comprising a subset of the plurality of allocated data extents and a subset of the plurality of unallocated data extents,
  wherein each logical volume from among the one or more logical volumes is allocated to a different band.

17. The non-transitory machine readable medium of claim 16, comprising further machine executable code that causes the machine to:
  receive a requested reconstruction capacity;
  determine an amount for the subset of the plurality of unallocated data extents in each band on each storage device to accommodate the requested reconstruction capacity; and
  reserve the determined amount for the subset of the plurality of unallocated data extents in each band on each storage device for reconstruction.

18. The non-transitory machine readable medium of claim 16, wherein one or more of the plurality of storage devices comprises a hard drive having a plurality of tracks, comprising further machine executable code that causes the machine to:
  assign each band to a different subset of the plurality of tracks, wherein each band extends consecutively from an outer portion of the hard drive toward an inner portion of the hard drive.

19. The non-transitory machine readable medium of claim 15, comprising further machine executable code that causes the machine to:
  detect a replacement storage device that replaces the unavailable storage device; and
  logically divide the replacement storage device into the plurality of bands.

20. The non-transitory machine readable medium of claim 19, comprising further machine executable code that causes the machine to:
  transfer the reconstructed data extents from the remaining subset of the plurality of storage devices to the replacement storage device;
  store each reconstructed data extent in the same determined band as on the unavailable storage device; and
  de-allocate the data extents on the remaining subset of the plurality of storage devices.

* * * * *